United States Patent
Jankowski

(12) 
(10) Patent No.: US 7,325,817 B1
(45) Date of Patent: Feb. 5, 2008

(54) CLAMP FOR SECURING PANEL TO A CARRIAGE

(76) Inventor: Bryan C. Jankowski, 2279 Kelly Rd. SW., Albuquerque, NM (US) 87105

( * ) Notice: Subject to any disclaimer, the term of this patent is extended or adjusted under 35 U.S.C. 154(b) by 358 days.

(21) Appl. No.: 10/833,839

(22) Filed: Apr. 27, 2004

Related U.S. Application Data

(60) Provisional application No. 60/509,283, filed on Oct. 6, 2003.

(51) Int. Cl.
*B62B 1/00* (2006.01)

(52) U.S. Cl. .............. 280/79.7; 254/2 R; 269/905; 414/11; 414/451; 414/456; 414/458

(58) Field of Classification Search .......... 414/11, 414/458, 451, 456; 269/905; 280/79.7; 212/302, 306; 254/2 R; 410/77, 80
See application file for complete search history.

(56) References Cited

U.S. PATENT DOCUMENTS

| 3,643,935 | A |   | 2/1972  | Bell ......................... 269/16 |
| 3,923,167 | A |   | 12/1975 | Blankenbeckler ............ 214/1 |
| 4,050,671 | A |   | 9/1977  | Coleman |
| 4,810,151 | A |   | 3/1989  | Shern ......................... 414/11 |
| 5,464,315 | A | * | 11/1995 | Palmer et al. ............. 414/458 |
| 5,584,635 | A | * | 12/1996 | Stapelmann ................. 414/11 |
| 6,579,051 | B2 | * | 6/2003 | Echternacht ................. 414/11 |
| 7,014,413 | B2 | * | 3/2006 | Young ......................... 414/743 |
| 2003/0190219 | A1 |   | 10/2003 | Young ......................... 414/11 |

OTHER PUBLICATIONS

Merriam-Webster 10th Edition Collegiate Dicitionary definition of bracket.*

* cited by examiner

*Primary Examiner*—Saul Rodriguez
*Assistant Examiner*—M. S. Lowe
(74) *Attorney, Agent, or Firm*—Vidal A. Oaxaca; Peacock Myers, P.C.

(57) ABSTRACT

The present invention relates to a clamping apparatus for securing a panel, particularly a door, to a stationary or mobile carriage.

19 Claims, 5 Drawing Sheets

CLAMP FOR SECURING PANEL TO A CARRIAGE

This application claims the benefit of the filing of U.S. Provisional Patent Application Ser. No. 60/509,283 entitled "Mechanical Clamp for Securing a Construction Panel to a Wheeled Carriage", filed on Oct. 6, 2003, and the specification thereof is incorporated herein by reference.

BACKGROUND OF THE INVENTION

1. Field of the Invention (Technical Field)

The present invention relates to a clamping apparatus for securing a panel, particularly a door, to a stationary or mobile carriage.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Methods and devices for securing panels to carriages are known. Wheeled carriages are used in the construction field to transport and install such panels as doors. The most basic approach is to use a strap to secure the panel against the frame of the wheeled carriage. However, strapping a panel takes too much time, strapping a wide panel requires the aid of a second person, and straps weaken with time and are inherently elastic so that they are not very secure.

Other devices, such as that disclosed in U.S. patent application Ser. No. 10/116,470, Publication No. 2003/0190219, are designed to hold and move doors to aid in attaching them to doorways. Such devices do not provide an easy and economical means for doing so because they, as does patent application Ser. No. 10/116,470, incorporate the door holding means as part of the transportation carriage. Therefore, the carriages tend to be complex and expensive devices dedicated to moving and holding doors or other panels. Further, the holding means tend to damage door faces.

The prior art does not provide for a simple and economical, yet highly effective, method of securing a panel to a carriage. An apparatus is needed that can be attached to any number of carriers or surfaces to which a panel is to be secured.

BRIEF SUMMARY OF THE INVENTION

The present invention comprises an apparatus for attaching a panel to a carrier comprising an extendable arm, a holder attached to the extendable arm to hold the panel, and a fastener to attach the extendable arm to the carrier. The apparatus may comprise a mechanism to fix the extendable arm's length while in use. The apparatus may also comprise a mechanism, such as a spring, to pull the extendable arm in from its extended configuration when not in use.

The extendable arm may comprise an arm movably attached to, and extendable from, a second arm and may comprise a rod disposed and slidable within an outer tube.

The holder may comprise a clamp and may be L-shaped. The extendable arm may pivotally attach to the carriage, and may be removably attached to the carriage.

The invention further comprises a system for attaching a panel to a carrier comprising at least one extendable arm, a holder attached to each extendable arm to hold the panel, and a fastener to attach each extendable arm to the carrier.

The invention further comprises a method for holding a panel to a carrier comprising providing at least one extendable arm, disposing a holder on each extendable arm, disposing each extendable arm on a carrier, loading a panel onto the carrier, disposing the holder onto the panel, and adjusting each extendable arm so that each holder pulls the panel.

A primary object of the present invention is to provide for an inexpensive and effective means to hold a panel to a carriage or other surface.

A primary advantage of the present invention is that damage to a panel is minimized.

Another advantage of the present invention is that pre-existing carriages and surfaces can be modified to utilize the present invention and to hold panels.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into, and form a part of, the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention relates to a clamping apparatus for securing a panel, particularly a door, to a stationary or mobile carriage. The device comprises a telescoping, or extendable, arm that attaches at one end to a carriage and grasps a panel from the other end via a holder such as a clamp or hook. Two clamping apparatus preferably are utilized and attached onto a carriage to hold a panel to the carriage.

Figure 1:
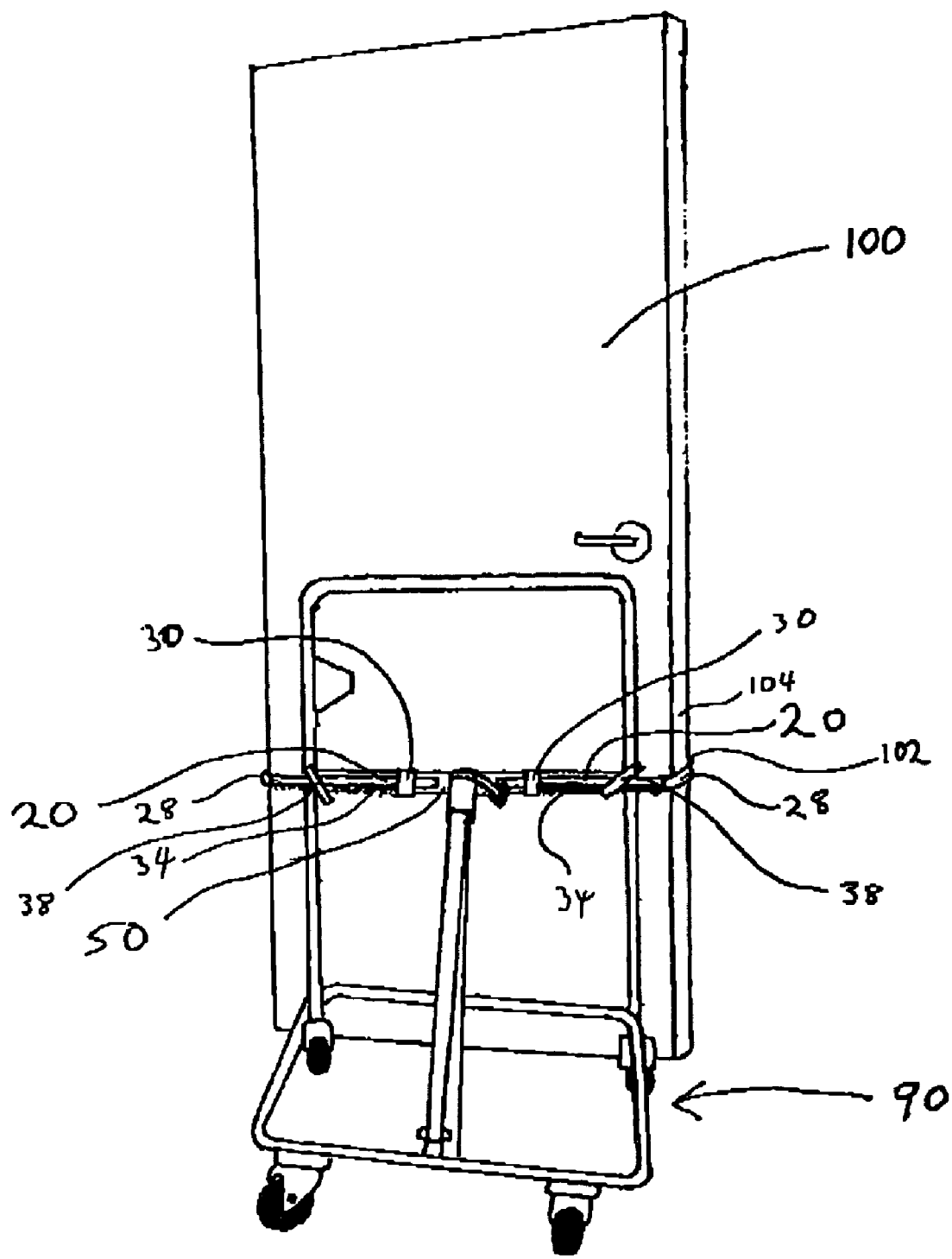
FIG. 1 shows two apparatus of the preferred embodiment of the present invention attached to a carriage and holding a panel.

Turning now to the figures, which describe the preferred embodiment of the present invention, FIG. 1 shows clamp apparatus 20 according to the invention holding panel 100 to carriage 90. Although carriage 90 is depicted in the preferred embodiment, any surface, frame, or extension, whether as part of a stationary or mobile object, may serve as the object to which clamp apparatus 20 holds panel 100. It is contemplated that the carriage 90 may be any of the wheeled dollies or carriages common in the construction industry, but the invention is not so limited in use. Therefore, where used throughout the description and the claims herein, the term "carriage" is defined as any object to which a panel is to be held. Also, the preferred embodiment depicts panel 100 as the item to be held to carriage 90, but any item with generally cubic dimensions may be held by clamp apparatus 20. Therefore, where used throughout the description and the claims herein, the term "panel" is defined as any item of approximately rectangular, square, or cubic dimensions to be secured by clamp apparatus 20.

In FIG. 1, apparatus 20 is shown, one on each side, disposed on frame bar 50 of carriage 90 and holding panel 100. Shown are brace 30, spring 34, clamp 28, and handle 38, all discussed below in more detail.

Figure 2A:
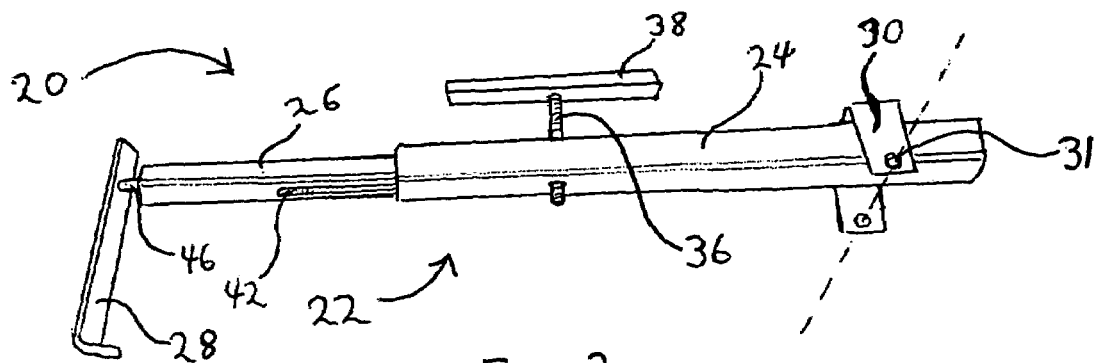
FIG. 2a is a perspective view showing the apparatus of the preferred embodiment of the present invention.

FIG. 2a is a top view of clamp apparatus 20 comprising extendable arm 22. Extendable arm 22 comprises outer tube 24 and rod 26. Rod 26 is disposed within outer tube 24. The length of extendable arm 22 is adjustable by pulling rod 26 out of, or pushing rod 26 into, outer tube 24. Bracket 30 is attached to one end of outer tube 24 and attaches outer tube 24 to frame bar 50 (shown in FIGS. 1 and 5) of carriage 90. Although the figures show frame bar 50, other embodiments may provide for the attachment of clamp apparatus 20 to another type surface, tube, etc.

Slot 42 in rod 26 runs along most of the length of rod 26 and forms a long opening through opposing faces of rod 26. Threaded rod 36 is disposed through slot 26, thereby permitting rod 26 to slide axially in and out of outer tube 24, past threaded rod 36, without hindrance. Thus, a wide range of panel widths to be secured may be accommodated.

Figure 2B:
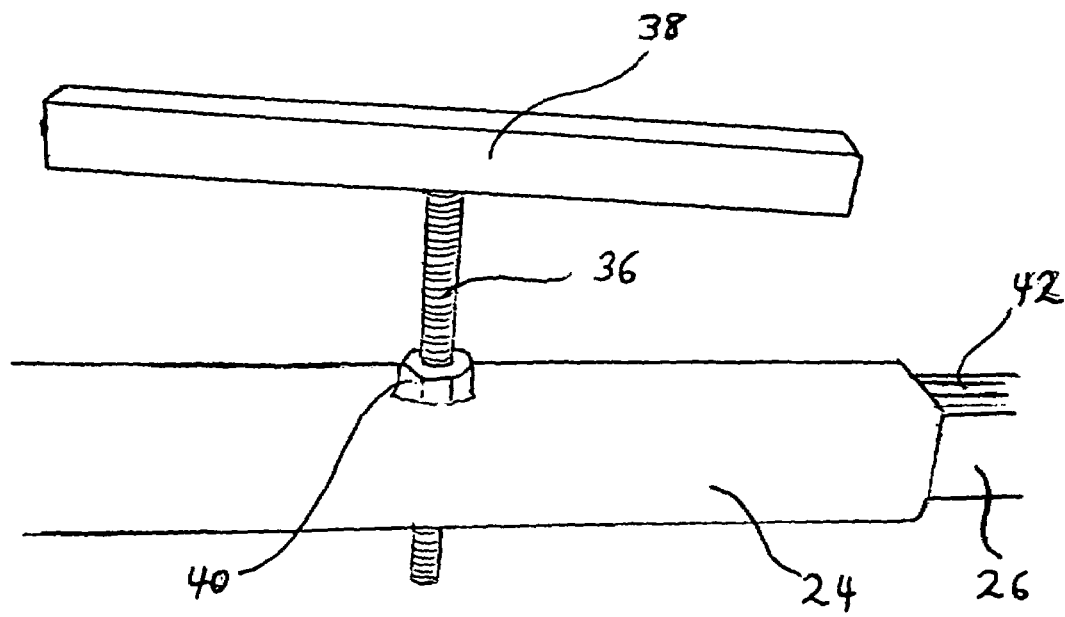
FIG. 2b is an enlarged perspective view of the adjustable threaded rod portion of the preferred embodiment.
Figure 5:
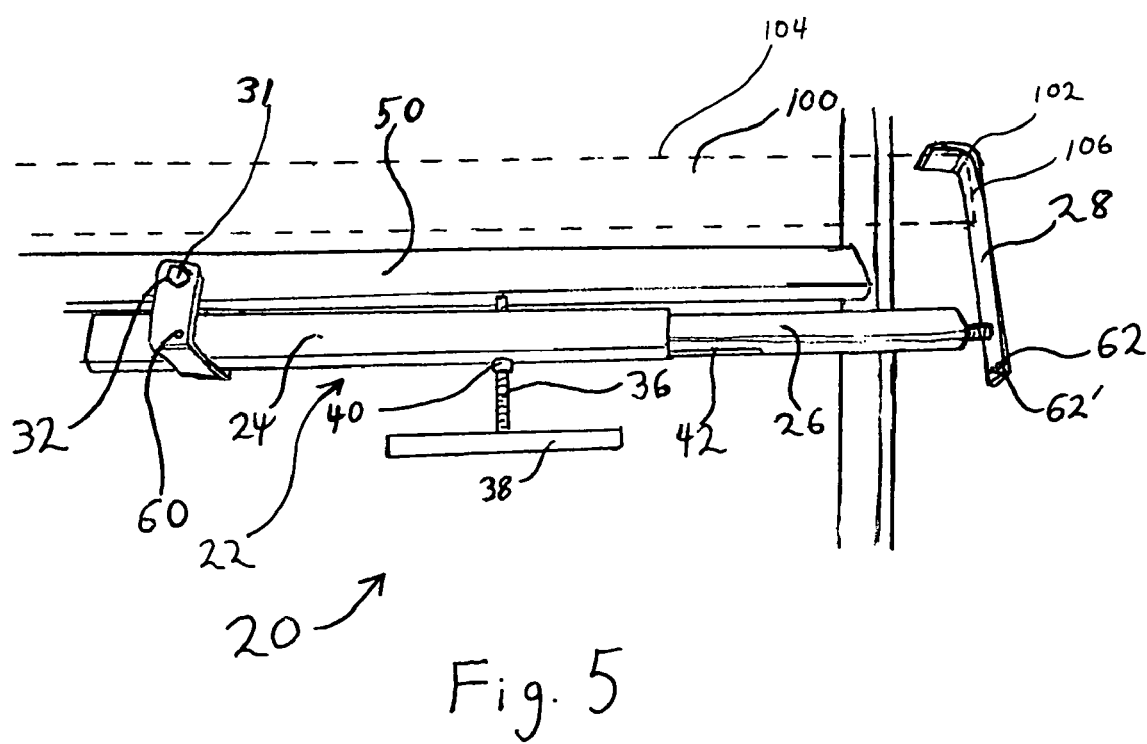
FIG. 5 is a perspective close-up view of the apparatus of the preferred embodiment of the present invention shown attached to a carriage and holding a panel.

As shown in FIG. 2b and FIG. 5, threaded rod 36 screws into threaded receptor 40, and threaded receptor 40 is disposed on outer tube 24. Threaded receptor 40 is preferably disposed from between approximately 4 inches to approximately 12 inches from axis point 31 (FIG. 2a), more preferably approximately 7 inches from axis point 31. Handle 38 connects to threaded rod 36 to aid in turning threaded rod 36. Threaded rod 36 turns to pull extendable arm 22 away from frame bar 50 so that clamp apparatus 20 pulls panel 100 against carriage 90. This clamping work is discussed in more detail below.

Figure 3A:
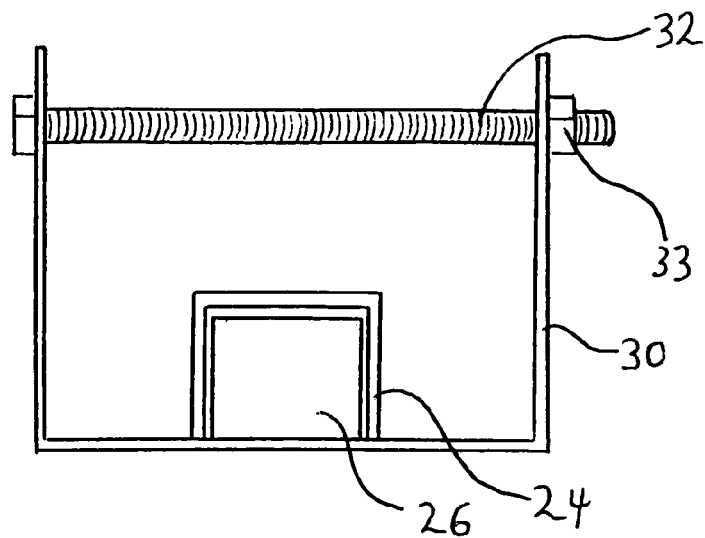
FIG. 3a shows an enlarged cross section of the bracket portion of the preferred embodiment.
Figure 3B:
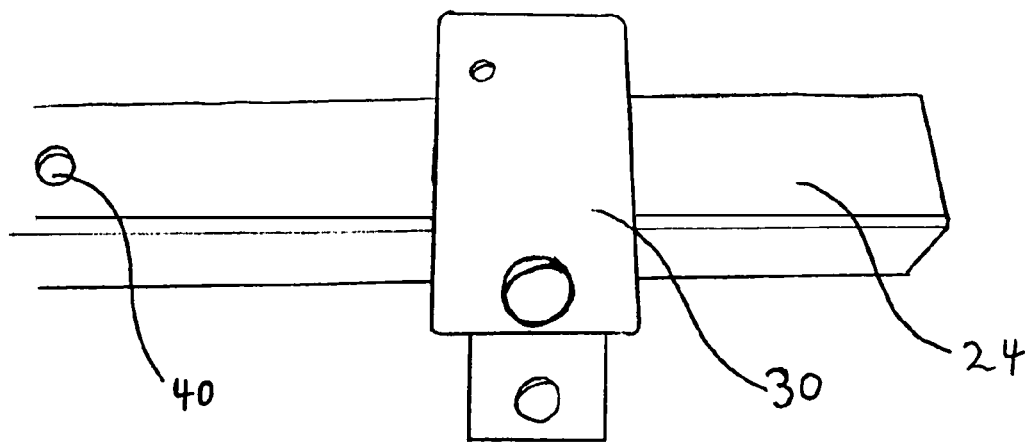
FIG. 3b is a perspective view of the bracket of the preferred embodiment.

Bracket 30 swivels about axis point 31 through which a fastener such as, for example, bolt 32 with nut 33 (shown in FIG. 3a), attaches clamp 30 to frame bar 50. Bracket 30 is preferably a "U"-shaped bracket, with faces disposed at approximately right angles or with a rounded face. In the preferred embodiment, axis point 31 is approximately 3 inches from the end of outer tube 24 opposite the end to which clamp 28 attaches. In other embodiments, other type attachment devices, mechanisms, or structures, other than a bracket, may be utilized to pivotally attach clamp apparatus 20 to frame bar 50. FIGS. 3a and 3b provide some detail regarding bracket 30.

FIG. 3a shows a cross section of outer tube 24 and rod 26 with bracket 30 attached to outer tube 24. Bracket 30 is preferably fixed to outer tube 24 through any means known in the art such as, for example, welding. Bolt 32, with attached nut 33, is shown running through opposite faces of clamp 30 and through frame bar 50 so that clamp 30 is pivotally attached to frame bar 50.

At the end of outer tube 24, opposite the end to which bracket 30 attaches, threaded extension 46 of clamp 28 screws into receptor 44. In the preferred embodiment, as shown in the figures, and FIG. 4b in particular, clamp 28 comprises at least two faces 27, 29 disposed at a right angle relation (i.e., preferably "L"-shaped). The longitudinal plane of long face 27 is preferably disposed at a right angle to the longitudinal axis of threaded extension 46, but may be disposed at any degree of angle. Threaded extension 46 provides for additional adjustment for the overall length of clamp apparatus 20 and also provides for the ability of clamp 28 to swivel so that its attachment to panel 100 is made easier.

Figure 4A:
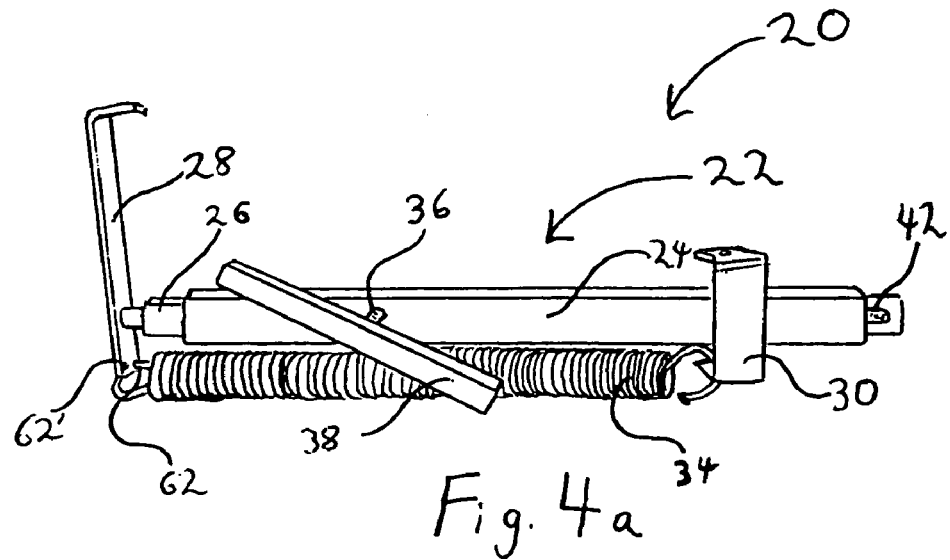
FIG. 4a is a perspective view of the apparatus showing the spring of the preferred embodiment.
Figure 4B:
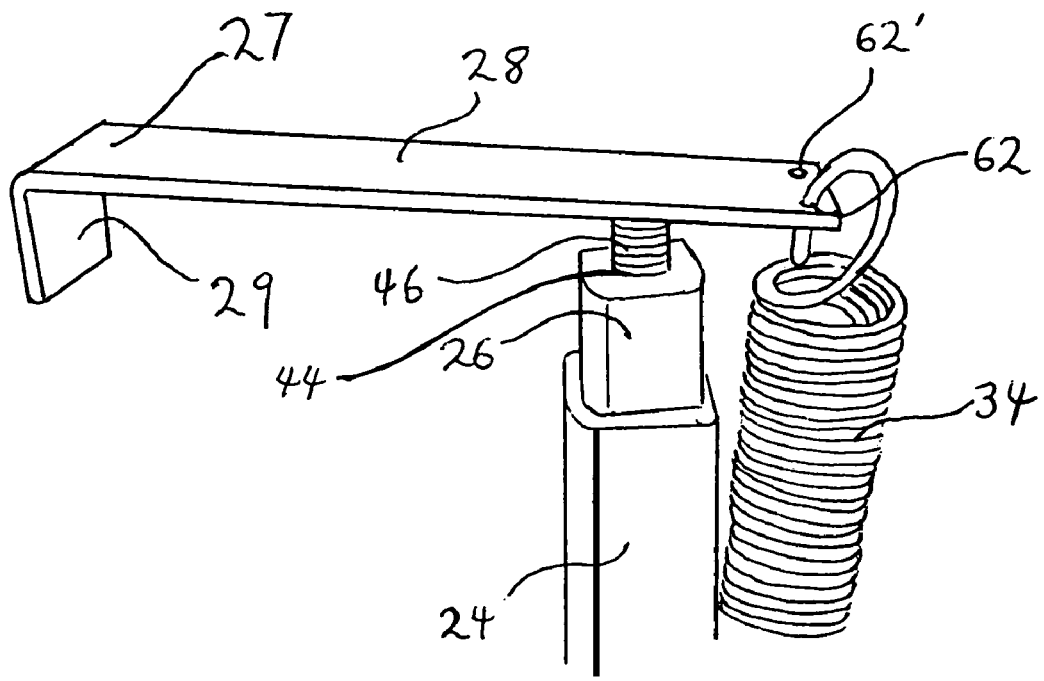
FIG. 4b is a close-up perspective view of the clamp and spring portions of the preferred embodiment.

As shown in FIGS. 4a and 4b, spring 34 connects from one end at point 60 of bracket 30 and from the opposite end at points 62 or 62' of clamp 28. Point 62 is depicted as the point chosen for attachment of spring 34, and point 62' is the alternate point—the selection of point depends on the orientation chosen for attaching clamp apparatus 20 to frame tube 50, such as whether clamp apparatus 20 is disposed on the left side or right side of carriage 90. Spring 34 secures panel 100 in a lateral axis by pulling rod 26 into outer tube 24. Thus, panel 100 is held in place until more securely attached to carriage 90 as described herein or until completely released from carriage 100. Thus, in the preferred embodiment, spring 34 is a means for retaining extendable arm 22 in a retracted position when not in use. However, any means to retain extendable arm 22 in a retracted position may be utilized. Further, although rod 25 and tube 24 provide the means for adjusting the length of extendable arm 22, any means may be utilized to make the length of extendable arm 22 adjustable.

FIG. 5 shows a top view of clamp apparatus 20 (without spring 34 attached) holding panel 100. As threaded rod 36 screws into threaded receptor 40, threaded rod 36 pushes against frame bar 50 so that extendable arm 22 pulls away from frame bar 50 as it swivels about point 31. As extendable arm 22 pulls away from frame bar 50, clamp 28 pulls panel 100 toward carriage 90. The force applied by extendable arm 22 via clamp 28 acts generally upon panel 100 at point 102 of panel 100 which is the corner juncture of face 104 and side edge 106 of panel 100. Thus, clamp 28 does not come into full contact with face 104 of panel 100 so that the potential for damage to panel 100 is greatly minimized. Also, the pulling away of arm 22 from frame bar 50, and the action of clamp 28 upon panel 100, help fix the positions of outer tube 24 and rod 26 in relation to each other.

Clamp apparatus 20 is preferably disposed on carriage 90 between approximately 8 inches and approximately 20 inches, more preferably approximately 12 inches, below the top of the working structure of carriage 90.

Clamp apparatus 20 may comprise any rigid, strong material such as those typically used in the art, preferably steel.

In the preferred embodiment, panels of widths ranging from between approximately 32 inches to approximately 50 inches may be accommodated. However, in other embodiments, apparatus 20 may be scaled larger or smaller by varying the lengths and other dimensions of outer tube 24, rod 26 and threaded extension 46.

In another embodiment intended for larger and/or heavier panels, a system/assembly of roller bearings (not shown)

disposed along the longer, longitudinal axis of outer tube 24 and/or rod 26 may be incorporated to facilitate the use of apparatus 20 on larger applications such as, for example, by reducing friction.

In the preferred embodiment, clamping apparatus 20 is attached to carriage 90 with fasteners, but in other embodiments, apparatus 20 may be permanently fixed onto carriage 90. Further, carriage 90 may be constructed with apparatus 20 incorporated onto carriage 90 as an inherent step in the construction of carriage 90. Again, in all embodiments, carriage 90 may comprise any movable or stationary object to which clamping apparatus 20 may be attached and to which it is desired to secure panel 100 such as a wall, a frame, a vehicle, etc.

Thus, in the preferred embodiment, apparatus 20 is used by first, preferably, attaching apparatus 20 to carriage 90 via bracket 30. Then, panel 100 is loaded onto carriage 90. Rod 26 is pulled past panel 100 and clamp 28 is disposed onto side edge 106 of panel 100. Handle 38 is then tightened to secure panel 100 against carriage 90.

EXAMPLE

Two apparatus in accordance with the description provided herein were constructed and used successfully as follows:
1. The apparatus was constructed of steel.
2. Two apparatus were attached to a Door Jak™ 50 carriage obtained from Hardnox, LLC.
3. The dimensions of each of the two apparatus were as follow:
Outer Tube:
    Length of outer tube=approx. 13 inches
    Outer dimensions of outer tube cross section=approx. 1 cu. inch
    Inner dimensions of outer tube cross section=approx. $13/16$ cu. inch
Rod:
    Length of rod=approx. 14½ inches
    Outer dimensions of rod cross section=approx. $11/16$ inch
    Length of slot within rod=approx. 10 inches
    Width of slot within rod=approx. $5/16$ inch
    Point slot begins on rod from end of rod to which clamp attaches=approx. 4 inches
Spring:
    Length of spring=approx. 12 inches
    Diameter of spring=approx. ⅞ inch
Bracket:
    Width of bracket faces=approx. 1 inch
    Length of opposing bracket faces (attachable to carriage)=approx. 2 inches
    Length of bracket face attached to outer rod=approx. 2½ inches
    Point from nearest end of outer tube where bracket attaches=approx. 2 inches
L-clamp:
    Length of L-clamp=approx. 5¼ inches
    Length of shorter face of L-clamp=approx. 1 inch
    Length of threaded extension inserted into extendable rod=approx. 4 inches
    Outer diameter of cross section of threaded extension=approx. $5/16$ inch
    Point from end of length of L-clamp where threaded extension attaches=approx. 1 inch
Handle and Threaded Rod:
    Length of handle for threaded rod=approx. 5 inches
    Outer dimensions of cross section of handle for threaded rod=approx. $7/16$ inch
    Length of threaded rod=approx. 3 inches
    Outer diameter of cross section of threaded rod=$3/16$ inch
    Point from nearest end of outer tube where threaded receptacle is disposed=approx. 3½ inches The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for releasably securing a panel to a carriage comprising:
    an extendable arm having a first end and a second end and having an adjustable length, said extendable arm comprising a first arm movably attached to, and extendable from, a second arm;
    a holder attached to said first end of said extendable arm to hold the panel;
    a bracket comprising a pivot attachment point having a pivot axis substantially perpendicular to a longitudinal axis of said extendable arm, said bracket attached to said second end of said extendable arm to attach said extendable arm to the carriage; and
    a positioning, biasing component attached to said extendable arm at a point between said first and second ends of said extendable arm for positioning and biasing said extendable arm in a direction away from the carriage thus holding the panel as said extendable arm pivots about said bracket pivot attachment point at said second end.

2. The apparatus of claim 1 further comprising a length fixing component for fixing said length of said extendable arm while in use.

3. The apparatus of claim 1 further comprising a retaining component for retaining said extendable arm in a retracted position when not in use.

4. The apparatus of claim 3 wherein said retaining component comprises a spring.

5. The apparatus of claim 1 wherein said positioning, biasing component comprises a rod.

6. The apparatus of claim 1 wherein said first arm comprises a rod, said second arm comprises a tube, and said first arm is slidably disposed within said tube.

7. The apparatus of claim 6 wherein said clamp is L-shaped.

8. The apparatus of claim 1 wherein said holder comprises a clamp.

9. The apparatus of claim 1 wherein said extendable arm is removably attached to said carriage.

10. The apparatus of claim 1 wherein said holder holds the panel at a corner juncture of a face and a side edge of the panel.

11. The apparatus of claim 1 wherein said holder is swivelly attached to said first end.

12. The apparatus of claim 1 wherein said first arm defines a slot extending therethrough and said positioning, biasing component is disposed through the slot.

13. A system for attaching a panel to a carriage comprising:
- at least one extendable arm having a first end and a second end, said extendable arm comprising a first arm movably attached to, and extendable from, a second arm;
- a holder attached to each said first end of each said extendable arm to hold the panel;
- a bracket attached to each second end of each said extendable arm to attach each said extendable arm to the carriage, each said bracket comprising a pivot attachment point having a pivot axis substantially perpendicular to a longitudinal axis of each said extendable arm; and
- a positioning, biasing component attached to each said extendable arm at a point between said first and second ends of each said extendable arm for positioning and biasing each said extendable arm in a direction away from the carriage thus holding the panel as each said extendable arm pivots about each said bracket pivot attachment point at each said second end.

14. The apparatus of claim 13 wherein said holder holds the panel at a corner juncture of a face and a side edge of the panel.

15. The apparatus of claim 13 wherein said holder is swively attached to each said end.

16. The apparatus of claim 13 wherein said first arm defines a slot extending therethrough and said positioning, biasing component is disposed through the slot.

17. A method for holding a panel to a carriage comprising the steps of:
- providing at least one extendable arm;
- disposing a holder on a first end of each at least one extendable arm;
- pivotally attaching a second end of the at least one extendable arm to the carriage so that the second end pivots about a substantially vertical pivot axis;
- loading the panel onto the carriage;
- disposing the holder onto the panel; and
- positioning and biasing the at least one extendable arm against the carriage so that the holder pulls the panel as the at least one extendable arm pivots at the second end and the at least one extendable arm moves in a direction away from the carriage.

18. The method of claim 17 wherein said holder is disposed onto a corner juncture of a face and a side edge of the panel.

19. The method of claim 17 wherein said holder is swively disposed on said first end of each at least one extendable arm.

* * * * *